Aug. 16, 1932.   I. J. REMARK   1,871,560
RUBBER STOCK FEEDING DEVICE
Filed Sept. 7, 1926   2 Sheets-Sheet 2
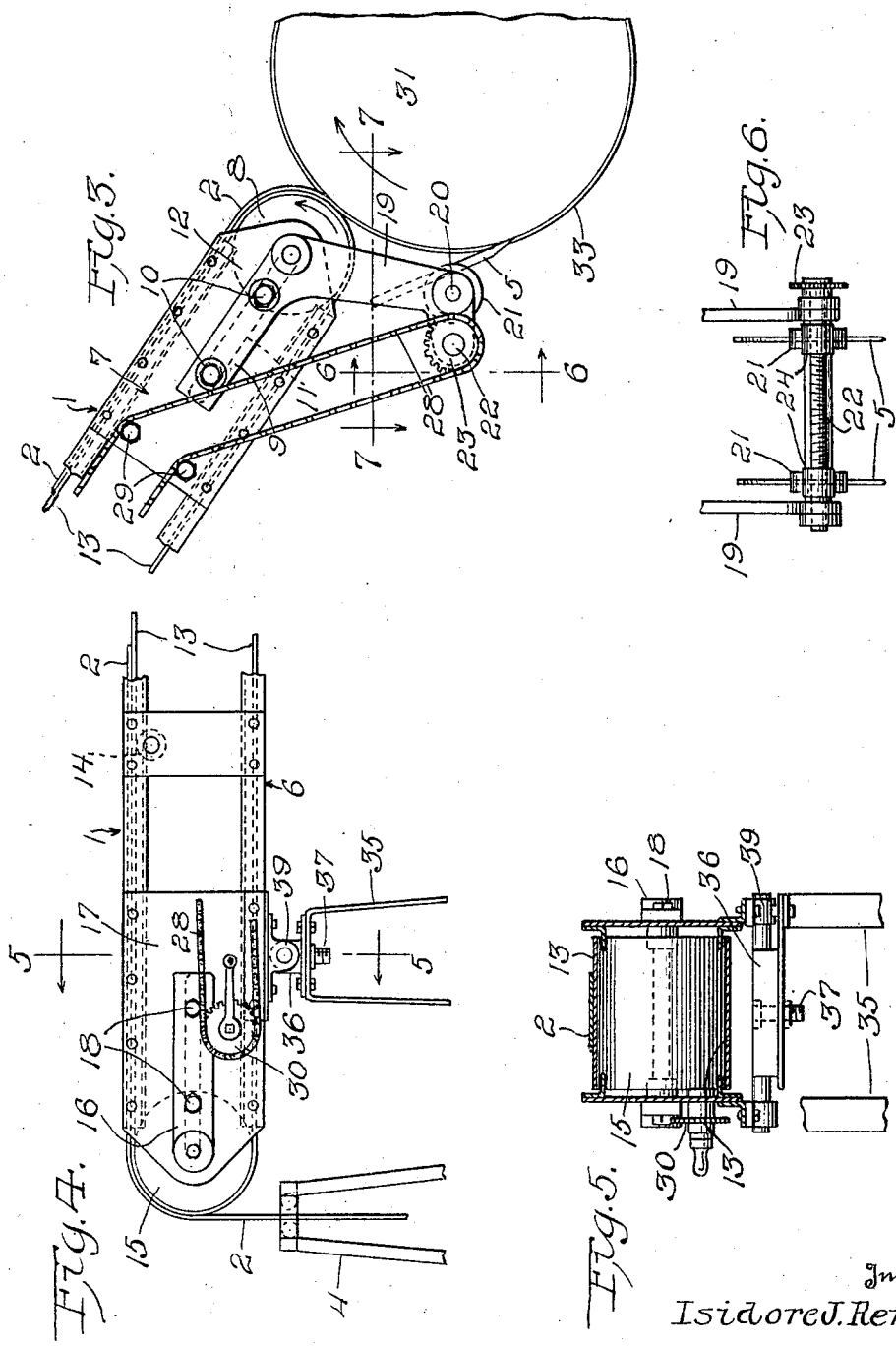
Inventor
Isidore J. Remark
By
Evans & McCoy.
Attorney Patented Aug. 16, 1932

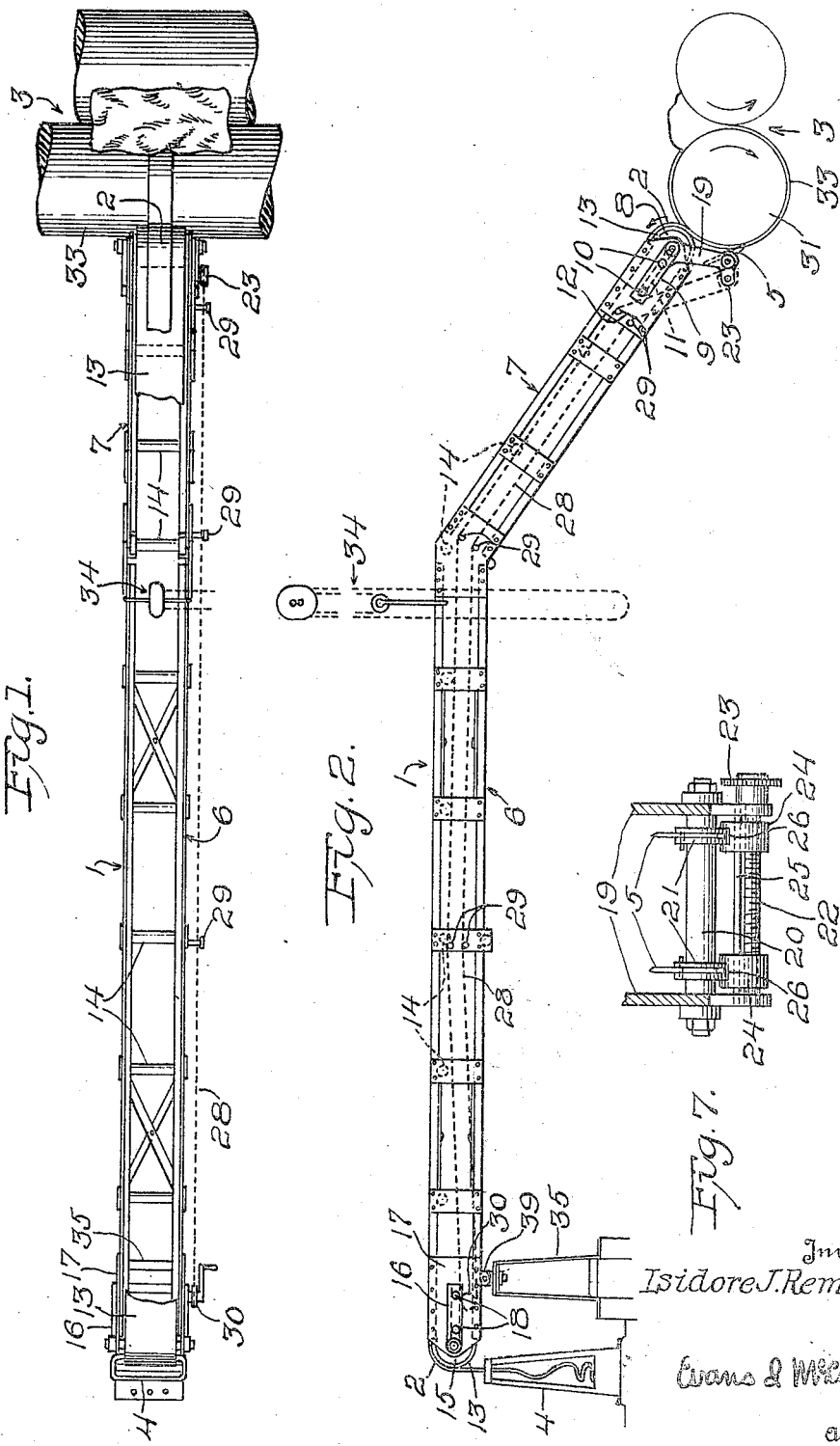

1,871,560

UNITED STATES PATENT OFFICE

ISIDORE J. REMARK, OF AKRON, OHIO, ASSIGNOR TO THE GENERAL TIRE & RUBBER COMPANY, OF AKRON, OHIO, A CORPORATION OF OHIO

RUBBER STOCK FEEDING DEVICE

Application filed September 7, 1926. Serial No. 134,076.

This invention relates to stock conveying and feeding devices and particularly to a rubber stock feeding device for use in feeding milled rubber stock to an extruding machine, or other device, from a rubber mill.

So far as applicant is aware, it has heretofore been customary to manually transfer milled rubber stock from the rubber mills to rubber extruding machines. The stock is then fed into the hopper of the extruding machine by hand.

The device herein proposed and constructed in accordance with this invention is adapted to supply milled rubber stock at a regulated rate from the stock being worked on by the mill to the hopper of an extruding machine, or other device adapted to receive milled rubber.

One of the objects of the invention is to provide a machine of the above designated character that is capable of supplying milled rubber stock from the mill rolls directly to an extruding machine or other rubber working device at a regulatable rate.

Another object of the invention is to provide a device of the above designated character that can conveniently be moved out of the way of operators engaged in working at the rubber mill.

A further object of the invention is to provide means for adjustably regulating the rate of feed of the milled stock to the extruding machine or other rubber working device.

Another object of the invention is to provide a machine in which the supply of milled rubber stock can be controlled from the delivery end thereof.

A further object of the invention is to provide a machine of the character proposed that is operated from power supplied from one of the mill rolls.

These and other objects and advantages to be obtained from the practice of the invention will be apparent from the consideration of the accompanying specification and drawings wherein:

Figure 1 is a top plan view of a stock feeding machine constructed in accordance with this invention.

Fig. 2 is a side elevational view of the machine shown in Fig. 1.

Fig. 3 is a side elevational view of the stock receiving end of the device showing a portion of one of the mill rolls from which stock is delivered to the stock feeding device.

Fig. 4 is an enlarged side elevational view of the delivery end of the feeding machine.

Fig. 5 is a sectional view of the pivoted hinge mounting of the delivery end of the stock feeding device, taken substantially on line 5—5 of Fig. 3, looking in the direction of the arrows.

Fig. 6 is an enlarged detailed view of the stock separating mechanism at the receiving end of the device, the view being taken substantially on line 6—6 of Fig. 4 looking in the direction of the arrows; and Fig. 7 is a top view of the stock separating mechanism taken substantially on line 7—7 of Fig. 4.

The machine shown in the accompanying drawings as illustrative of the invention comprises a stock conveying mechanism 1 that receives a regulatable quantity of milled rubber stock 2 from the rubber mill 3 and delivers it to the hopper 4 of an extruding machine. The rubber stock 2 is separated from the stock on the rubber mill 3 by a pair of cutters 5 that provide a strip of regulatable width of rubber stock received by the conveyor belt 1.

The conveyor frame has a substantially horizontal portion 6 and an inclined portion 7 that is rigidly connected therewith. This form of conveyor frame permits workmen to pass beneath it during its operation.

Fig. 3 is an enlarged view of the stock receiving end of the device showing its operative relation with one of the rolls of the rubber mill 3.

The conveyor frame has an idler pulley 8 mounted in a pair of adjustable brackets 9 that are each adjustably secured to the conveyor frame by bolts 10 which extend through a slot 11 that is formed in a side plate 12 of the conveyor frame. Sliding the brackets relative to the frame provides an adjustment for regulating the tension of the conveyor belt 13. A series of idler rolls 14, that are carried by the conveyor frame, serve to support the conveyor belt during its operation.

The delivery end of the conveyor frame also has a freely rotatable conveyor pulley 15 that is carried by adjustable brackets 16 that are each secured to a side plate 17 of the frame by bolts 18. The plates 17 are each slotted for the bolts 18 in order to permit adjustment of the tension of the conveyor belt.

The brackets 9 respectively have downwardly extending arm portions 19 each of which carries one end of a transverse shaft 20 on which the spaced cutters 5 are adjustably supported in carrier blocks 21 that are slidably and rotatably mounted on the shaft 20. A threaded adjustment shaft 22 that has a sprocket 23 mounted on one end thereof is also rotatably supported in the arm portions 19. The shaft 22 has opposed screw threaded portions that respectively have an adjustment nut 24 mounted thereon. A transverse guide shaft 25, that extends through each adjustment nut, prevents the turning of the nut on the threaded shaft although it permits separational movement of the nuts in response to rotation of the adjustment screw. Each adjustment nut has a groove 26 formed in its operating face to receive one of the knife supporting sleeves 21 therebetween and to move the sleeve along the shaft 20 with movement of the cooperating adjustment nut. The knife supporting sleeves are of cylindrical form in order that they may rotate on their supporting shaft 20 in following the surface of the mill roll.

Rotation of the sprocket 23 causes the adjustment nuts to travel in opposite directions and to carry cutter elements 5 with them. The drag of the rubber stock against the cutting edge of the knives is sufficient to separate the strip 2 of milled stock from the sheet of stock carried by the roll and to hold the knife in cutting position during operation of the machine.

The sprocket 23 is controlled from an adjustment chain 28 that extends therearound and over a series of supporting bracket bolts 29 that are carried by the frame, to a sprocket 30 that is pivotally supported adjacent the delivery end of the frame. The sprocket 30 has an adjustment wheel, or other conveniently operated device, mounted thereon for moving the same to different adjusted positions.

The rubber mill 3 is of conventional form having a pair of mill rolls 31 and 32 between which the rubber stock is masticated. The differential temperature of the rolls causes the rubber stock to follow roll 31 and to form a sheet 33 of masticated rubber stock thereon. As the roll 31 with its sheet 33 of milled rubber travels past the cutter elements 5, the strip 2 of milled rubber stock is separated from the sheet by the cutter elements 5 and carried back over the conveyor belt 1, to the hopper 4 of the extruding machine, or other rubber stock receiving device.

The conveyor belt is driven by contact with the sheet 33 of masticated rubber that is carried by the roll 31. The weight of the conveyor unit is so regulated by means of an adjustable supporting mechanism 34, such for instance as a block and tackle unit, as to give the desired driving contact between the mill roll 26 and the conveyor belt that rests thereagainst. The block and tackle unit 34 is used to regulate this contact pressure in order that the pressure may be sufficiently great to satisfactorily operate the conveyor belt without welding the separated strip 2 of rubber stock to the remainder of the sheet 33 that moves between the drum supported conveyor belt and the roll 31 of the rubber mill.

The frame of the machine is supported from a pivoted hinge that is preferably located near the delivery end of the device and mounted on a pedestal 35. The pivoted hinge permits the receiving end of the conveyor to be raised by the block and tackle and swung to one side of the mill so that the mechanism will be removed from the zone of operation of the mill attendant when the device is not in use.

The pivoted hinge mounting is shown in enlarged view in Fig. 5 that represents a sectional view of the conveyor unit taken substantially on line 5—5 of Fig. 4. One corner of the pedestal is broken away to more clearly shown the hinge mounting. The hinge pintle 36 has a pivot bolt 37 extending therethrough and secured to the top pivot plate 38 of the pedestal. The under face of the pintle 36 and the upper face of the pivot plate are flat so that the pintle bar 36 may swing about the pivot bolt 37 when the receiving end of the conveyor mechanism is swung to one side or the other. The end portions 38 of the pintle are pivotally mounted in a pair of spaced bearing blocks 39 that are carried by the under side of the conveyor frame.

The stock feeding device herein proposed may be used in any relation with other machines to which it is desired to convey milled rubber stock or other similarly prepared material.

The rubber stock is first warmed up by operating the mill with the conveyor unit swung to one side out of the way of the mill attendant. The feeding mechanism is then lowered to operative relation with the mill by manipulation of the block and tackle device. By adjustment of the block and tackle unit, the pressure of the conveyor belt 1 against the sheet 33 of milled rubber is so regulated as to drive the conveyor belt at substantially the speed of travel of the rubber sheet 33. The knives 5 are then set into the rubber and, if it is found that the device is feeding material too rapidly to the hopper 4 of the extruding machine, the quantity of rubber that is contained in the strip 2 is reduced by manually adjusting the control sprocket wheel to thereby draw the cutter knives together a sufficient degree to properly reduce the volume of rubber being supplied to the extruding machine. In like manner an increased quantity of rubber stock can be supplied to the hopper by separating the knives through operation of the control sprocket. A single operator can conveniently attend to both the extruding machine and the rubber mill. The location of the adjustment or control sprocket at the delivery end of the unit enables the operator to give close attention to the extruding machine.

If it is desired to initially prepare the rubber stock for use in extruding machines, or to otherwise operate the mill independently of the feeding mechanism, the feeding mechanism is lifted entirely away from the mill by the block and tackle mechanism and swung to one side well out of the way of the mill operator.

Although I have herein described only one preferred application of the invention, it will be apparent to those skilled in the art that many other applications of the invention may be made without departing from the invention herein defined.

What I claim is:

1. The combination with a rubber mill having a roll to which the rubber stock adheres, of a conveyor belt having an end portion closely adjacent said roll in contact with the rubber stock adhering to the roll, said belt being driven solely by its engagement with the rubber stock adhering to said roll and in a direction such that the upper run of the belt moves away from the roll, whereby a strip of stock may pass from the roll to the belt at the point where the stock is engaged by both the roll and belt and be delivered by the belt to a remote operating station.

2. A stock feeding device comprising means adapted to separate a strip of milled stock from rubber stock being milled by a rubber mill, a conveyor belt operated from said rubber mill and adapted to receive and convey said strip of milled stock from the rubber mill to a remote operating station, and means located at the remote station for adjusting the rate of supply of stock to said device.

3. A stock feeding device comprising means adapted to separate a strip of milled stock from rubber stock being milled by a rubber mill, a conveyor belt operated from said rubber mill and adapted to receive and convey said strip of milled stock from the rubber mill to a remote operating station, and means located at the remote station for adjusting the cross sectional area of said strip of rubber stock to thereby control the rate of supply of stock by said device.

4. The combination with a rubber mill, of a pair of spaced cutters adapted to separate a strip of milled rubber stock from the stock being operated upon by the mill, a conveyor adapted to receive and continuously convey said strip of rubber stock from the mill to a remote point of use, and remotely controlled means for moving the cutters, one relatively to the other, to vary the width of the strip being delivered from the mill to the conveyor during operation of the machine.

5. A feeding device for supplying milled rubber stock at a regulated rate from a rubber mill to an extruding machine comprising a conveyor belt extending from the mill to the extruding machine and operated at the peripheral speed of one of the mill rolls, a pair of spaced cutters arranged to sever a strip of milled rubber stock from the stock being operated upon by the mill, and means connected to the cutters for simultaneously adjusting the same to regulate the spaced relation of the cutters to thereby control the rate of feed of milled rubber stock from the mill to the extruding machine.

6. The combination with a rubber mill and an extruding machine of a conveyor that extends from the rubber mill to the extruding machine, a pivoted and hinged mounting for said conveyor adjacent the delivery end thereof, means for raising and lowering said conveyor out of and into operating relation with said rubber mill, said conveyor being operated substantially at the peripheral speed of operation of one of the mill rolls, and a pair of spaced cutters adapted to sever a strip of milled rubber stock from the stock being worked upon by the rubber mill.

7. The combination with a rubber mill and an extruding machine of a conveyor that extends from the rubber mill to the extruding machine, a pivoted and hinged mounting for said conveyor adjacent the delivery end thereof, means for raising and lowering said conveyor out of and into operating relation with said rubber mill, said conveyor being operated substantially at the peripheral speed of operation of one of the mill rolls, and a pair of spaced cutters adapted to sever a strip of milled rubber stock from the stock being worked upon by the rubber mill, said cutters being regulatable from the vicinity of said extruding machine to control the cross sectional area of the strip of milled rubber stock that is supplied to said extruding machine.

8. The combination with a rubber mill and an extruding machine of a conveyor that extends from the rubber mill to the extruding machine, a pivoted and hinged mounting for said conveyor adjacent the delivery end thereof, means for raising and lowering said conveyor out of and into operating relation with said rubber mill, said conveyor being operated substantially at the peripheral speed of operation of one of the mill rolls, and cutting mechanism adapted to sever a continuously advancing strip of milled rubber from the stock being worked upon by the rubber mill.

9. The combination with a rubber mill having a roll to which the rubber stock adheres, of a pair of cutters engaging the periphery of the roll at longitudinally spaced points to separate a strip of rubber stock, a conveyor for continuously conveying the strip so separated from the mill, supports for the cutters mounted for movement longitudinally of the roll, and a remotely controlled mechanism for actuating said supports to vary the distance between the cutters and control the width of said strip during delivery of stock from the mill to the conveyor.

10. The combination with a rubber mill having a roll to which the rubber stock adheres, of a conveyor belt having an end portion in driven contact with the rubber stock adhering to the roll, said belt being operated at substantially the peripheral speed of said roll in a direction such that the upper run thereof moves away from the roll, whereby a strip of stock may pass from the roll to the belt at the point where the stock is engaged by both the roll and belt and be delivered by the belt to a remote operating station.

11. The combination with a rubber mill having a roll to which the rubber stock adheres, of a conveyor comprising an endless belt and a frame for supporting the belt, said conveyor being mounted for adjustment to a position in which an end portion of the conveyor belt lies closely adjacent said roll in contact with the rubber stock adhering to the roll and to an inoperative position with respect to the mill, and a pair of cutters carried by said conveyor frame and engageable with the periphery of the roll to sever a strip of milled rubber stock from the stock being operated upon by the rubber mill.

12. The combination with a rubber mill having a roll to which the rubber stock adheres, of a conveyor comprising an endless belt and a frame for supporting the belt, said conveyor being mounted for adjustment to a position in which an end portion of the conveyor belt is driven by frictional contact with the rubber stock adhering to the roll and for adjustment to an inoperative position with respect to the mill, a pair of cutters carried by said conveyor frame and engageable with the periphery of the roll to sever a strip of milled rubber stock from the stock being operated upon by the rubber mill, and means operable from the discharge end of said conveyor belt for shifting said cutters to vary the width of the strip being severed by the cutters.

13. The combination with a rubber mill having a roll to which the rubber stock adheres, of a conveyor belt having an end portion in driven contact with the rubber stock adhering to the roll, said belt being operated at substantially the peripheral speed of said roll in a direction such that the upper run thereof moves away from the roll, whereby a strip of stock may pass from the roll to the belt at the point where the stock is engaged by both the roll and belt and be delivered by the belt to a remote operating station, a pair of cutters engaging said roll at longitudinally spaced points to sever a strip of milled rubber stock from the stock being operated upon by the rubber mill before the stock is engaged by the conveyor, and manually controlled means operable from the discharge end of said conveyor belt for moving said cutters longitudinally of the roll to vary the width of the strip delivered from the roll to the conveyor belt.

In testimony whereof I affix my signature.

ISIDORE J. REMARK.